UNITED STATES PATENT OFFICE.

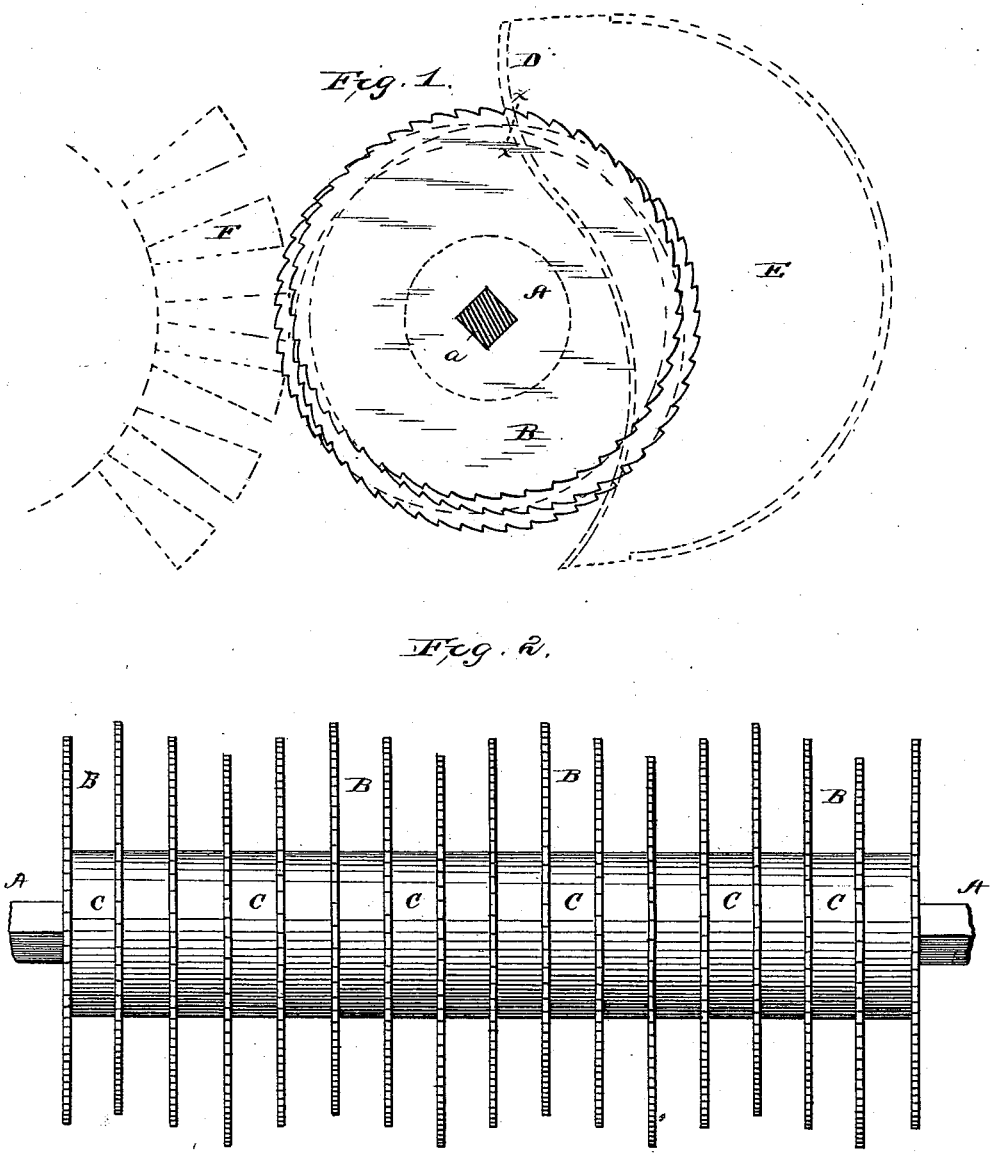

RHODON M. BROOKS, OF JENKINSVILLE, GEORGIA.

COTTON-GIN.

SPECIFICATION forming part of Letters Patent No. 255,926, dated April 4, 1882.

Application filed February 3, 1882. (No model.)

*To all whom it may concern:*

Be it known that I, RHODON M. BROOKS, of Jenkinsville, in the county of Pike, and in the State of Georgia, have invented certain new and useful Improvements in Cotton-Gins; and I do hereby declare that the following is a full, clear, and exact description thereof, reference being had to the accompanying drawings, and to the letters of reference marked thereon, making a part of this specification.

This invention relates to an improvement on cotton-gins. In cotton-gins having the saws arranged concentrically on their mandrels it is found that the edges of the grid-bars are worn away at the points where the saw-teeth draw the fibers of lint between the bars. The passages thus formed soon become so much enlarged that they allow the seeds to be drawn through the grid with the lint. When this takes place a new grid must be substituted in place of that which is rendered useless.

To obviate the above objection and to still further improve a cotton-gin, the nature of my invention will be fully understood from the following description when taken in connection with the annexed drawings.

In the annexed drawings, Figure 1 is a vertical transverse section through a saw-arbor, showing saws applied eccentrically thereon. This view also shows the cotton-box, its grid, and the brush-cylinder in dotted lines. Fig. 2 is a top view of a gang of saws applied eccentrically on a mandrel.

The following description of my invention, when taken in connection with the annexed drawings, will enable others skilled in the art to understand it.

A designates the saw-mandrel, and B circular ginning saws or pickers, which are applied on the mandrel A and properly spaced thereon by means of collets or washers C, which are of uniform thickness. Consequently the saws will be equidistant from each other.

E designates the chamber for containing the cotton to be ginned; D, the grid, between the parallel bars of which the lint is drawn by the saws; and F is the brush-cylinder. The cotton-box, the grid, and the brush-cylinder may be constructed in the usual well-known manner.

The saws are circular, and their teeth may be formed like those on the gin-saws in common use. Instead of punching the square eyes $a$ through the centers of these saws, I punch the eyes eccentric to the axes of the saws, the degree of eccentricity of a saw of the ordinary diameter being about one-eighth of an inch, more or less.

The saws thus constructed are applied on the mandrel A as follows: A saw is slipped on the mandrel, a collet, C, is then applied, and another saw is applied on the mandrel, so that its longest radius is ninety degrees, or one quarter of a circle from the longest radius of the first saw. The third and fourth saws are applied in a similar manner. The fifth saw completes the series, and the longest radius of this saw corresponds to the longest radius of the first saw applied on the mandrel. It will thus be seen that the saws are all eccentrically applied on the mandrel, and are arranged, as shown in Figs. 1 and 2, so that a gang of saws on a mandrel will run evenly or without wabbling. The gang of saws operate on the unginned roll in the box E with a drawing movement.

By reference to Fig. 1 it will be seen that the saws in their rotation do not draw the lint through the spaces between the grid-bars in the same horizontal line. In other words, the point of draft of the teeth of each saw is constantly varying with respect to the grid-bars during each revolution of the saw. The distance of variation referred to is indicated by the letters $x\ x$, Fig. 1, and it is between these points that friction and consequent wear are produced on the grid-bars.

By my invention I not only render the grids more durable, but the ginning operation is greatly facilitated, and the roll of unginned cotton in the box E is kept in an open condition and thoroughly stirred when the saws are in motion.

Having described my invention, I claim—

The combination, with the grid-bars, of the gin-saws, arranged eccentrically on their mandrel, substantially in the manner and for the purposes specified.

In testimony whereof I affix my signature, in presence of two witnesses, this 2d day of February, 1882.

R. M. BROOKS.

Witnesses:
J. J. MCCARTHY,
CHAS. D. DAVIS.